(12) United States Patent
Nagashima

(10) Patent No.: US 8,484,033 B2
(45) Date of Patent: Jul. 9, 2013

(54) SPEECH RECOGNIZER CONTROL SYSTEM, SPEECH RECOGNIZER CONTROL METHOD, AND SPEECH RECOGNIZER CONTROL PROGRAM

(75) Inventor: Hisayuki Nagashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1645 days.

(21) Appl. No.: 11/656,943

(22) Filed: Jan. 24, 2007

(65) Prior Publication Data

US 2007/0203699 A1 Aug. 30, 2007

(30) Foreign Application Priority Data

Feb. 24, 2006 (JP) .................................. 2006-48572

(51) Int. Cl.
*G10L 21/00* (2006.01)

(52) U.S. Cl.
USPC ......................................... 704/275; 704/270

(58) Field of Classification Search
USPC .................................................. 704/270, 275
See application file for complete search history.

(56) References Cited

U.S. PATENT DOCUMENTS

| | | | | |
|---|---|---|---|---|
| 5,983,186 A * | 11/1999 | Miyazawa et al. | ............. | 704/275 |
| 6,385,582 B1 * | 5/2002 | Iwata | ............................ | 704/270 |
| 6,505,161 B1 * | 1/2003 | Brems | ........................... | 704/270 |
| 6,839,670 B1 * | 1/2005 | Stammler et al. | ............. | 704/251 |
| 7,010,332 B1 * | 3/2006 | Irvin et al. | ................. | 455/575.2 |
| 7,016,836 B1 * | 3/2006 | Yoda | ............................. | 704/233 |
| 7,426,467 B2 * | 9/2008 | Nashida et al. | ............... | 704/275 |
| 7,529,676 B2 * | 5/2009 | Koyama | ........................ | 704/275 |
| 2002/0077772 A1 * | 6/2002 | Squibbs | ........................ | 702/159 |
| 2002/0082836 A1 * | 6/2002 | Squibbs | ........................ | 704/270 |
| 2002/0193989 A1 * | 12/2002 | Geilhufe et al. | ............. | 704/208 |
| 2002/0198714 A1 * | 12/2002 | Zhou | ............................. | 704/252 |
| 2003/0144845 A1 * | 7/2003 | Lee | ................................ | 704/275 |
| 2004/0030560 A1 * | 2/2004 | Takami et al. | ................ | 704/275 |
| 2007/0219805 A1 * | 9/2007 | Nomura | ........................ | 704/275 |

FOREIGN PATENT DOCUMENTS

JP 2001-249685 A 9/2001

* cited by examiner

*Primary Examiner* — Jialong He
(74) *Attorney, Agent, or Firm* — Arent Fox LLP

(57) ABSTRACT

A speech recognizer control system, a speech recognizer control method, and a speech recognizer control program make it possible to properly identify a device on the basis of a speech utterance of a user and to control the identified device. The speech recognizer control system includes a speech input unit to which a speech utterance is input from a user, a speech recognizer which recognizes the content of the input speech utterance, a device controller which identifies a device to be controlled among a plurality of devices on the basis of at least the recognized speech utterance content and which controls an operation of the identified device, and a state change storage which stores, as first auxiliary information for identifying a device to be controlled, a state change other than at least a state change caused by a speech utterance from the user among the state changes of operations in the individual devices of the plurality of devices. The device controller carries out first device identification processing for identifying the device to be controlled on the basis of the recognized speech utterance content, and if the device cannot be identified by the first device identification processing, then the device controller uses at least the first auxiliary information to identify the device.

10 Claims, 7 Drawing Sheets

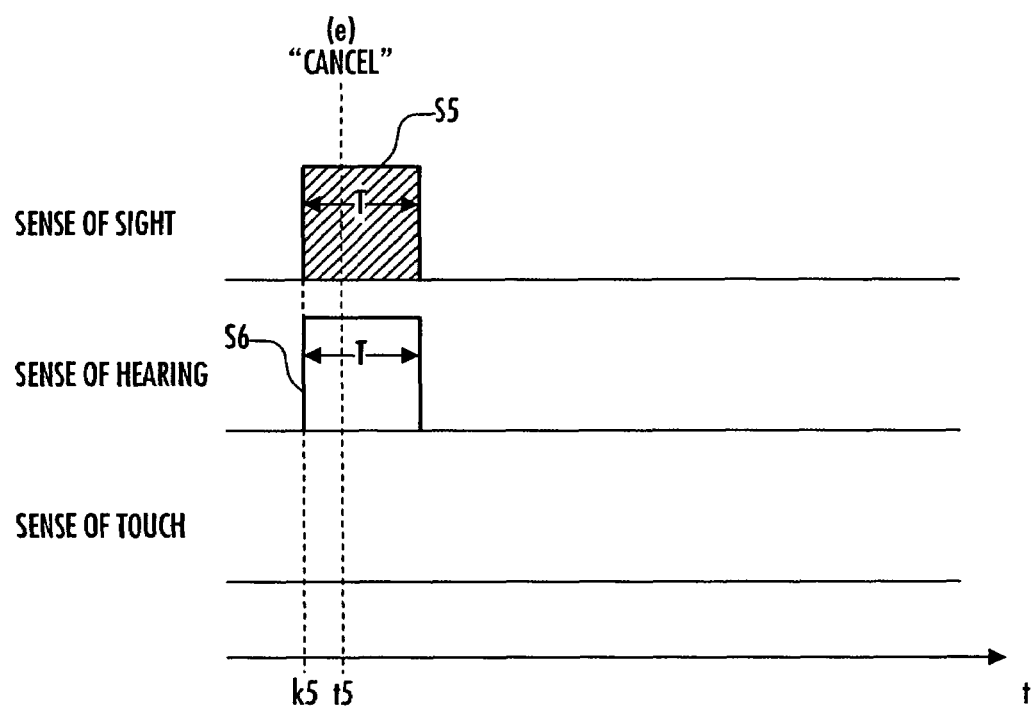

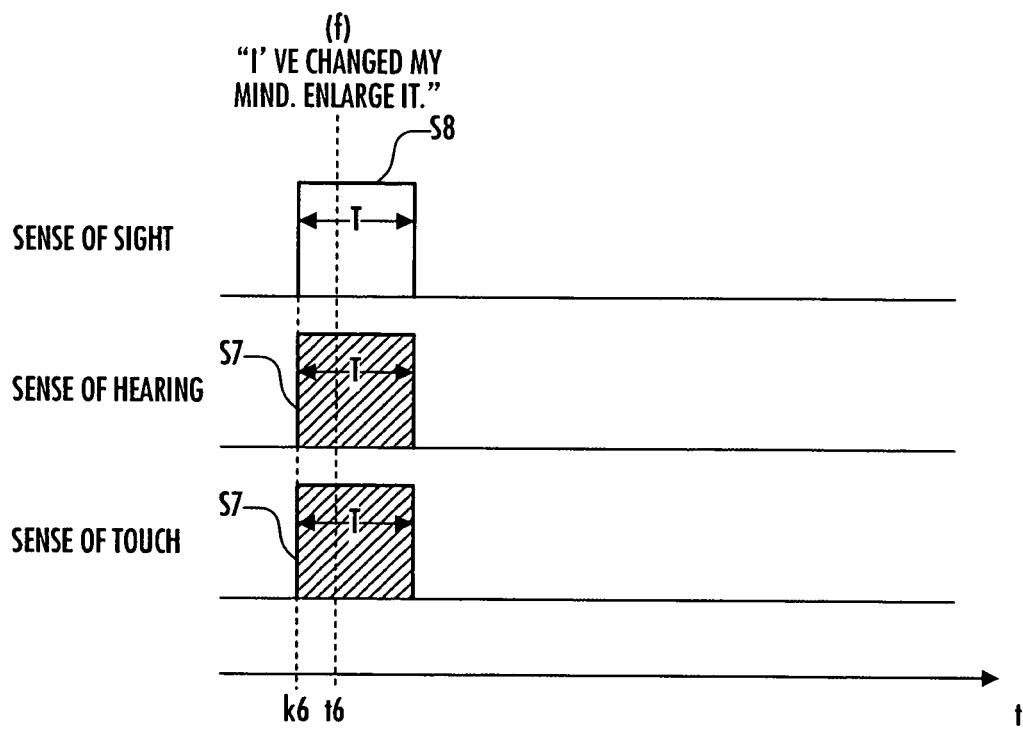

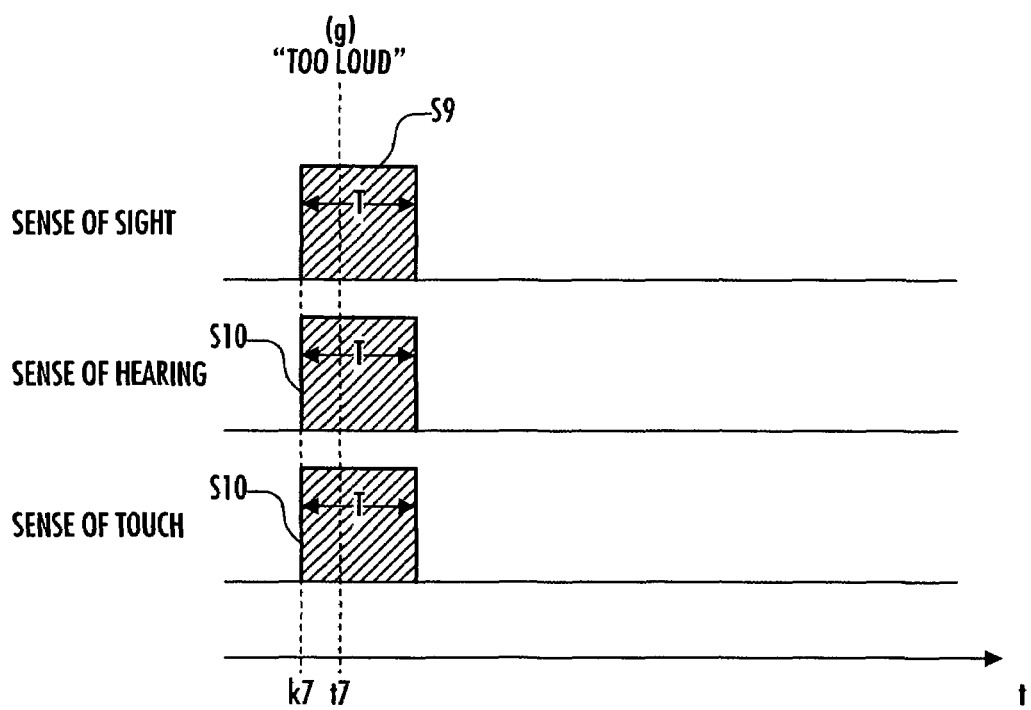

SPEECH RECOGNIZER CONTROL SYSTEM, SPEECH RECOGNIZER CONTROL METHOD, AND SPEECH RECOGNIZER CONTROL PROGRAM

BACKGROUND OF THE INVENTION

1. Field of the Invention

The present invention relates to a speech recognizer control system, a speech recognizer control method, and a speech recognizer control program for recognizing a speech utterance input from a user and then acquiring information for controlling a device on the basis of the result of the recognition.

2. Description of the Related Art

In recent years, a system for a user to, for example, operate a device, uses a speech recognizer control system that recognizes speech utterances input by the user and acquires information required to operate the device. Such a speech recognizer control system recognizes voices or speech utterances input by the user, then responds or outputs voice guidance on the basis of the result of the recognition, and prompts the user for a further speech utterance, thereby interacting with the user. As a result of the recognition of the dialogues with the user, the information required to operate the device is obtained and the device is controlled.

Such a speech recognizer control system is mounted in, for example, a vehicle, to control devices, such as an audio device, a navigation device, and an air conditioner. If there is a plurality of types of devices to be controlled, then the user is required to identify the type of a device and an intended operation of the device, that is, hierarchical items, such as the type of a function of the device and an intended operation of the device to be controlled among multiple devices. This inevitably complicates the input of speech utterances by the user. Hence, there has been proposed a speech recognizer control system adapted to interactively obtain information that is necessary for the control or the like of a device while prompting a user to input missing information, thus obviating the need for speech utterance input by the user to supply information on the type, the function, the operation, or the like of the device in a hierarchical order (refer to, for example, Japanese Patent Application Publication No. 2001-249685 (hereinafter referred to as "Patent Document 1")).

A voice interactive device, which is the speech recognizer control system in Patent Document 1, is equipped with tree-structured data for recognizing speech utterances, which is comprised of groups of hierarchical items related to the types, the functions, and the operations of devices involved. The grouped items for the recognition of speech utterances are arranged and connected in a hierarchical order. The voice interactive device obtains items of the speech utterance recognition tree-structured data that are missing in completing the tree structure on the basis of input signals received from a speech recognizer, and presumes an item intended by a user among the missing items and presents the presumed item to the user so as to prompt the user to input the required item. Then, when the tree has been formed, a signal associated with the tree is output to an external source. Based on the output signal, a response for confirmation with the user is given, and the device is controlled. At this time, if the voice interactive device cannot presume the item that is considered to be intended by the user on the basis of the input signal received from the speech recognizer, then the voice interactive device presumes the item on the basis of a last mode in which a last operation end state of the device has been stored. For example, if the last mode on "audio" is composed of "audio," "MD," and "first number," and if "audio" is input, then it will be presumed that the user intends to play the first number of the MD by the audio device.

Meanwhile, in some devices, operations are automatically performed. For example, in a vehicle, when shuffle playback of an audio device or automatic control of an air conditioner is carried out, the operations of playing back a number and changing an air volume or a set temperature are automatically performed by the devices, meaning that they are operations not intended by a driver. Further, a device may be operated by speech utterances by a plurality of users. For instance, there is a case where a device is operated by speech utterances by a passenger rather than a driver. In this case also, the operations are the ones not intended by the driver. When an operational state of a device is changed irrespectively of a user, the user may stop or change the operation. At this time, a speech utterance from the user is reflectively made in response to the operation not intended by the user, or the user may not be familiar with speech utterances for operating the device probably because he/she infrequently uses the device. It is expected, therefore, that speech utterances from the user will be unclear, leading to high possibility that the speech utterances include insufficient information.

However, the voice interactive device presumes an item considered to be intended by a user by assuming that the user is very likely to select the same operation as in the last mode. In other words, the voice interactive device assumes that a device is operated by speech utterances of the same user. Therefore, if an operation is automatically performed by a device or an operation is performed by a speech utterance of another user or if a speech utterance of the user is for an operation not intended by the user, then the voice interactive device fails to properly presume the type or the like of a certain device to be controlled. This has been inconveniently leading to inefficient responses to the user or inefficient control of the device.

SUMMARY OF THE INVENTION

Accordingly, it is an object of the present invention to provide a speech recognizer control system, a speech recognizer control method, and a speech recognizer control program that eliminate the inconvenience described above and make it possible to properly identify a device in response to a speech utterance of a user and to properly control the device.

To this end, a speech recognizer control system according to a first mode of the present invention has: a speech input unit to which a speech utterance is input from a user; a speech recognizer which recognizes the content of the speech utterance input to a speech input unit; a device controller which identifies a device to be controlled among a plurality of devices on the basis of at least the content of the speech utterance recognized by the speech recognizer and which controls an operation of the identified device; and a state change storage which stores, as first auxiliary information for identifying a device to be controlled, a state change other than at least a state change caused by a speech utterance of the user among the state change of an operation in each device of the plurality of devices, wherein the device controller executes first device identification processing for identifying the device to be controlled on the basis of the content of the speech utterance recognized by the speech recognizer, and if the device cannot be identified by the first device identification processing, then the device controller uses at least the first auxiliary information stored by the state change storage to identify the device.

According to the speech recognizer control system in accordance with the first mode of the present invention, the device controller identifies a device to be controlled among a plurality of devices on the basis of the content of a speech utterance recognized by the speech recognizer. When controlling an operation of the device, the device controller carries out the first device identification processing for identifying the device to be controlled. At this time, there are cases where a speech utterance of a user that has been input to the speech input unit lacks in information required to identify a device to be controlled. In such a case, the device controller will not be capable of identifying the device to be controlled by the first device identification processing.

A plurality of devices may, due to their functional specifications or the like, perform operations not intended by the user, that is, operations other than those based on the contents of speech utterances of the user recognized by the speech recognizer. The user may issue an instruction by a speech utterance for stopping or changing such an operation not intended by the user. At this time, the speech utterance of the user is reflectively made, while there are many cases where, for example, the user infrequently uses the device and is not familiar with speech utterances for operating the device. It is expected, therefore, that speech utterances from the user will be unclear, leading to high possibility that the speech utterances include insufficient information.

Hence, the state change storage stores, as first auxiliary information for identifying a device to be controlled, a state change other than at least a state change caused by a speech utterance from the user among the state changes of operations in the individual devices of the plurality of devices. If the device cannot be identified by the first device identification processing, then the device controller uses at least the first auxiliary information stored by the state change storage to identify the device. In this case, it is highly probable that a state of the device has changed by an operation not intended by the user and the user has input a speech utterance associated with the operation, so that it is possible to properly identify the device to be controlled by using the first auxiliary information and to control the identified device.

Preferably, the state change storage stores a state change that has automatically occurred in each of the devices as the first auxiliary information.

In this case, the state change that has automatically occurred in each device indicates an operation of the device not intended by the user, so that if the device to be controlled cannot be identified by the first device identification processing, then the first auxiliary information stored by the state change storage is used to permit proper identification of the device to be controlled and the control of the identified device.

Preferably, if the speech input unit receives speech utterances from the user and another person other than the user, respectively, and the speech recognizer recognizes the contents of the speech utterances input to the speech input unit while distinguishing the content of the speech utterance from the user from the content of the speech utterance from another person, then the state change storage stores a state change of an operation in each of the devices that has caused by the speech utterance of another person as the first auxiliary information.

In this case, the state change of the operation in the device caused by the speech utterance of another person indicates an operation not intended by the user; therefore, if the device to be controlled cannot be identified by the first device identification processing, then the first auxiliary information stored by the state change storage is used to permit proper identification of the device to be controlled and the control of the identified device.

Preferably, when the speech recognizer recognizes the content of a speech utterance input to the speech input unit by associating the content with one of a plurality of predetermined types of senses of the senses that a human being has, the state change storage stores the first auxiliary information by associating the first auxiliary information with one of the plurality of types of senses, and if the device to be controlled cannot be identified by the first device identification processing, then the device controller uses a piece of the first auxiliary information which is associated with the same type of sense as the type of sense with which the content of the speech utterance recognized by the speech recognizer is associated among the pieces of the first auxiliary information stored by the state change storage in order to identify the device.

In this case, the speech recognizer recognizes the content of a speech utterance input to the speech input unit by associating the content with one of a plurality of predetermined types of senses (e.g., the sense of sight, the sense of hearing, and the sense of touch) among the senses that a human being has (the so-called five senses). Meanwhile, it is conceivable that, for example, operations not intended by a user are performed in a plurality of devices, and there is a plurality of pieces of first auxiliary information. At this time, the state change storage stores the first auxiliary information by associating it with one of the plurality of types of senses, so that the relationship between the first auxiliary information and the content of a speech utterance is known. Hence, if the device controller cannot identify the device to be controlled by the first device identification processing, then the first auxiliary information corresponding to the same type of sense as the type of sense with which the content of the speech utterance has been associated is used to allow the device controller to properly identify the device to be controlled by using the first auxiliary information associated with the content of the speech utterance and to control the identified device.

Preferably, if the device to be controlled cannot be identified by the first device identification processing, then the device controller uses a latest piece of first auxiliary information among the pieces of first auxiliary information stored by the state change storage in order to identify the device.

More specifically, for example, operations not intended by a user may be performed in a plurality of devices and there may be a plurality of pieces of first auxiliary information. At this time, if it is assumed that the user reflectively inputs a speech utterance in response to a state change of a device caused by an operation that is not intended, then it is considered highly likely that the speech utterance of the user is a speech utterance relative to a latest state change. Hence, if the device controller cannot identify a device to be controlled by the first device identification processing, then the use of the latest first auxiliary information to identify the device enables the device controller to properly identify the device to be controlled by using the first auxiliary information related to the content of the speech utterance and to control the identified device.

Preferably, the state change storage stores, in addition to the first auxiliary information, a state change caused by a speech utterance of the user as second auxiliary information for identifying the device to be controlled, and if the device to be controlled cannot be identified by the first device identification processing, then the device controller executes second device identification processing for identifying the device by using the first auxiliary information stored by the state change storage, and if the device cannot be identified by the second device identification processing, then the device controller uses the second auxiliary information stored by the state change storage to identify the device.

In other words, if information required for a speech utterance of the user is missing and the device to be controlled cannot be identified by the first device identification processing, it is possible that, for example, an operation not intended by the user is not being performed and there is no first auxiliary information related to a speech utterance of the user. In such a case, the device controller will not be capable of identifying the device to be controlled by the second device identification processing.

Meanwhile, the user may give an instruction by a speech utterance for stopping or changing an operation of a device performed by a previous speech utterance of the user. At this time, the speech utterance of the user may be clearer than a reflective speech utterance relative to an operation of a device that is not intended, but may omit a content overlapping a previous speech utterance, leading to high possibility of insufficient information included in the speech utterance.

Thus, if the device controller cannot identify the device to be controlled by the second device identification processing, then the device controller uses the second auxiliary information to identify the device. In this case, it is highly likely that a state of the device has been changed due to an operation by a previous speech utterance of the user and the user has input a speech utterance relative to the operation, so that using the second auxiliary information makes it possible to properly identify the device to be controlled and to control the identified device.

Preferably, the speech recognizer control system according to the first aspect of the present invention is provided with a response output unit which outputs a response to the user and a response controller which controls the response such that, if there is a plurality of pieces of the first auxiliary information related to the content of a speech utterance recognized by the speech recognizer, the piece of the first auxiliary information to be used for identifying the device to be controlled is identified among the plurality of pieces of the first auxiliary information.

More specifically, for example, operations not intended by the user may be simultaneously performed in a plurality of devices and there may be a plurality of pieces of the first auxiliary information related to a speech utterance of the user. At this time, the response controller controls a response so as to select the first auxiliary information to be used for identifying a device to be controlled from among a plurality of first auxiliary information, thereby making it possible to properly prompt the user for another speech utterance. Thus, according to the present invention, the device to be controlled can be properly identified on the basis of the content of the next speech utterance, and the identified device can be controlled.

A speech recognizer control system according to a second mode of the present invention is provided with a microphone to which a speech utterance is input from a user and a computer which has an interface circuit for accessing speech data obtained through the microphone, recognizes the content of the speech utterance of the user input to the microphone by arithmetic processing by the computer, identifies a device to be controlled among a plurality of devices on the basis of at least the recognized content of the speech utterance, and controls an operation of the identified device, the speech recognizer control system including: a memory which stores, as first auxiliary information for identifying the device to be controlled, a state change other than at least a state change caused by the speech utterance from the user among the state changes of operations of the individual devices of the plurality of devices, wherein the computer executes first device identification processing for identifying the device to be controlled on the basis of the content of the speech utterance recognized by a speech recognizer and second device identification processing for identifying the device by using at least the first auxiliary information if the device cannot be identified by the first device identification processing.

The speech recognizer control system according to the second aspect is capable of providing the advantages, which have been explained in relation to the speech recognizer control system according to the first aspect of the present invention, by the arithmetic processing of the computer.

A speech recognizer control method in accordance with the present invention includes: a speech recognizing step which recognizes the content of a speech utterance of a user input to a speech input unit; a device controlling step which identifies a device to be controlled among a plurality of devices on the basis of at least the content of the speech utterance recognized in the speech recognizing step and which controls an operation of the identified device; and a state change storing step which stores in a state change storage, as first auxiliary information for identifying the device to be controlled, a state change other than at least a state change caused by a speech utterance from the user among the state changes of operations in individual devices of the plurality of devices, wherein the device controlling step executes first device identification processing for identifying the device to be controlled on the basis of the content of the speech utterance recognized in the speech recognizing step, and if the device cannot be identified by the first device identification processing, then at least the first auxiliary information stored in the state change storing step is used to identify the device.

According to the speech recognizer control method, as explained in relation to the speech recognizer control system according to the first aspect of the present invention, if the device to be controlled cannot be identified by the first device identification processing, then the device controlling step uses at least the first auxiliary information stored in the state change storing step to identify the device. In this case, it is highly probable that a state of the device has changed by an operation not intended by the user and the user has input a speech utterance associated with the operation, so that it is possible to properly identify the device to be controlled by using the first auxiliary information and to control the identified device.

A speech recognizer control program in accordance with the present invention is a speech recognizer control program which causes a computer to execute: speech recognition processing for recognizing the content of a speech utterance of a user input to a speech input unit; a device control processing for identifying a device to be controlled among a plurality of devices on the basis of at least the content of the speech utterance recognized by the speech recognition processing and for controlling an operation of the identified device; and a state change storage processing for storing in a state change storage, as first auxiliary information for identifying the device to be controlled, a state change other than at least a state change caused by a speech utterance from the user among the state changes of operations in individual devices of the plurality of devices, wherein the device control processing has a function that causes the computer to execute first device identification processing for identifying the device to be controlled on the basis of the content of the speech utterance recognized by the speech recognition processing, and second device identification processing for identifying the device by using at least the first auxiliary information if the device cannot be identified by the first device identification processing.

The speech recognizer control program makes it possible to cause a computer to execute the processing which permits the advantages explained in relation to the speech recognizer control system according to the first aspect of the present invention.

BRIEF DESCRIPTION OF THE DRAWINGS

FIG. 5 to FIG. 7 respectively show graphs illustrating examples of state changes of devices in the speech recognizer control system shown in FIG. 4.

DESCRIPTION OF THE PREFERRED EMBODIMENTS

First Embodiment

First, a first embodiment of the present invention will be explained with reference to FIG. 1 to FIG. 4.

Figure 1:
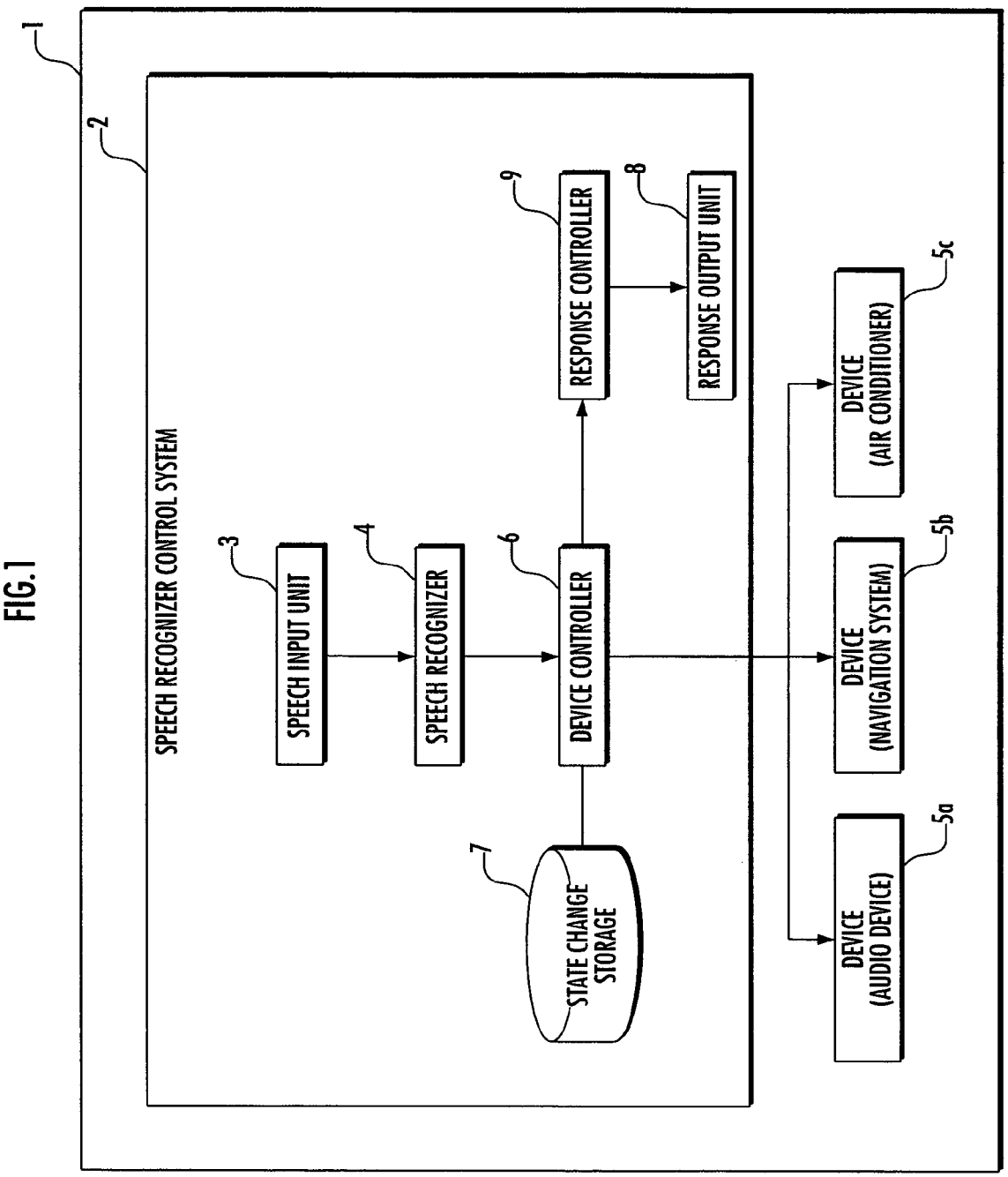
FIG. 1 is a functional block diagram of a speech recognizer control system, which is a first embodiment of the present invention.

Referring to FIG. 1, a speech recognizer control system 2 is equipped with, as its functions, a speech input unit 3 to which speech utterances are input from a driver, a speech recognizer 4 which recognizes the content of the input speech utterance, and a device controller 6 which identifies a device to be controlled among a plurality of devices 5a to 5c on the basis of the recognized speech utterance content and controls an operation of the identified device. The speech recognizer control system 2 is mounted in a vehicle 1. The speech recognizer control system 2 further includes a state change storage 7 which stores state changes of operations in the devices 5a to 5c as active states, a response output unit 8 which outputs responses to the driver, and a response controller 9 which controls responses to be output.

The speech recognizer control system 2 is an electronic unit composed of a computer (an arithmetic processing circuit composed of a CPU, a memory, input/output circuits, and the like, or a microcomputer which aggregates these functions) or the like that has a memory for storing speech data and an interface circuit for accessing (reading/writing) data stored in the memory and carries out various types of arithmetic processing on the speech data. As the memory for storing speech data, an internal memory of the computer or an external storing medium may be used.

The functions of the speech recognizer control system 2 are implemented by running, on the computer, a program stored beforehand in the memory of the computer. The program includes the speech recognizer control program in accordance with the present invention. The program may be stored in the memory in terms of a storage medium, such as a CD-ROM. Further, the program may be distributed or broadcast via a network or an artificial satellite from an external server and received by a communications device mounted in the vehicle 1 so as to be stored in the memory.

The speech input unit 3, which receives speech utterances of a driver of the vehicle 1, is composed primarily of a microphone and an input circuit for capturing speech utterances through the microphone into the memory.

The speech recognizer 4 carries out speech recognition processing, such as syntax analysis, on a speech utterance input to the speech input unit 3 and extracts a keyword. As the technique of the speech recognition processing, a general technique as described in Patent Document 1 may be used. At this time, the content of the speech utterance is associated with at least one of a plurality of predetermined types of senses (e.g., the sense of sight, the sense of hearing, and the sense of touch) among the senses that a human being has (the so-called five senses) by referring to, for example, a predetermined dictionary for speech recognition. In the present embodiment, the contents of speech utterances are associated with three types of senses, namely, the sense of sight, the sense of hearing, and the sense of touch. For example, the contents of speech utterances such as, "Too loud" and "Quiet," are auditory contents, so that they are associated with the sense of hearing. Further, for example, the contents of speech utterances such as, "Enlarge" and "Reduce," are visual contents, so that they are associated with the sense of sight. Further, the contents of speech utterances such as, "Go back" and "Cancel," may be associated with any senses, so that they are associated with all of the sense of sight, the sense of hearing, and the sense of touch.

The device controller 6 identifies a device to be controlled among the devices 5a to 5c on the basis of the content of a speech utterance recognized by the speech recognizer 4, and controls an operation of the identified device. At this time, the device controller 6 carries out the processing for identifying a device to be controlled (first device identification processing) on the basis of the keyword extracted by the speech recognizer 4 by referring to a predetermined table or the like which shows the correspondences between the keyword and items required to control the device (the device to be controlled and an item for specifying the control information on the device).

If the device controller 6 cannot identify the device to be controlled by the first device identification processing, then the device controller 6 carries out the processing for identifying the device to be controlled (the second device identification processing) by using an active state stored in the state change storage 7. At this time, an active state related to the content of the speech utterance recognized by the speech recognizer 4 among the active states stored by the state change storage 7 is used in the second device identification processing.

Specifically, the devices 5a to 5c are an audio device 5a, a navigation system 5b, and an air conditioner 5c, respectively, which are mounted in the vehicle 1. On each of the devices 5a to 5c, controllable components (devices, contents, etc.), functions, operations, and the like are determined in advance. The control items of the devices 5a to 5c are specified by the data on hierarchical items of the types of functions, the descriptions of operations, and the like (the input values of the items).

For instance, the audio device 5a has such items as CD, MD, RADIO, and VOLUME. In addition, the CD and the MD have subordinate items, such as PLAY and STOP. The RADIO has subordinate items, such as ON and OFF. Further, the VOLUME has subordinate items, such as HIGH and LOW. If, for example, "AUDIO, VOLUME, HIGH" is specified as the necessary item data for controlling a device, then the device controller 6 carries out control to increase the volume in the audio device 5a.

Further, the navigation system 5b has, for example, such items as SCREEN DISPLAY, VOICE GUIDANCE, and POINT OF INTEREST (POI) SEARCH. In addition, the SCREEN DISPLAY has subordinate items, including SWITCH, ENLARGE, and REDUCE, and the SWITCH has subordinate items, including MAP, SEARCH SCREEN, and AUDIO SCREEN. Further, if, for example, "navigation system, screen display, and enlarge" is specified as the necessary item data for controlling a device, then the device controller 6 carries out control to enlarge the screen display in the navigation system 5b.

Further, the air conditioner 5c, for example, has such items as AIR VOLUME, SET TEMPERATURE, ON, and OFF. Moreover, the AIR VOLUME and SET TEMPERATURE have subordinate items, including HIGH and LOW. If, for example, "air conditioner, air volume, and higher" is specified as the necessary item data for controlling a device, then the device controller 6 carries out control to increase the air volume in the air conditioner 5c.

The state change storage 7 is a storing medium in which the state changes of operations of the devices 5a to 5c are stored in an updatable manner. As the state change storage 7, an internal memory of the computer or an external storing medium may be used.

The state changes of the operations of the devices 5a to 5c are, for example, the discontinuous state changes in the devices 5a to 5c, such as increasing the air volume in the air conditioner 5c or playing a CD in the audio device 5a. The aforesaid state changes are stored in the state change storage 7 as active states until predetermined time T elapses from time kn at which the state change occurred. The processing for storing a state change in the state change storage 7 (the state change storage processing) is sequentially carried out when, for example, a state change takes place. The processing corresponds to the state change storing step in the speech recognizer control method in accordance with the present invention. The state change storage processing is implemented by running, on the aforesaid computer, the aforesaid program installed beforehand in the memory of the computer.

In the present embodiment, the state change storage 7 stores, as active states, the state changes which have automatically taken place in the devices 5a to 5c (state changes caused by operations other than those performed on the basis of the contents of a speech utterance recognized by the speech recognizer 4, i.e., state changes caused by operations according to the specifications or the like of the devices). The active states correspond to the first auxiliary information for identifying devices to be controlled.

The state change storage 7 associates an active state with one of the sense of sight, the sense of hearing, and the sense of touch when storing the active state, as with the content of a speech utterance recognized by the speech recognizer 4. At this time, the active state is associated with a sense on which the active state exerts an influence. For example, an active state associated with the sense of sight refers to a screen display change, the enlargement/reduction of screen display, or the like in the navigation system 5b. Similarly, an active state associated with, for example, the sense of hearing, refers mainly to play/stop of a CD, play/stop of an MD, ON/OFF of radio of the audio device 5a or a change of the air volume in the air conditioner 5c, or a change of the output of a voice guidance or a change of the volume of the voice guidance of the navigation system 5b. Further, an active state associated with, for example, the sense of touch, refers mainly to a change of the air volume or a change of a set temperature in the air conditioner 5c.

The response output unit 8, which outputs responses (voice guidance) to a driver of the vehicle 1, is composed primarily of a speaker and an output circuit for outputting voice through the speaker. Responses are given in terms of audio outputs by using the voice synthesis processing, such as Text to Speech (TTS).

The response controller 9 generates the content of a response to be output from the response output unit 8 by combining voices, phrases, sentences, and the like, which have been stored beforehand (a sentence of inquiry to prompt a driver for the next speech utterance or a sentence of response to confirm control details or the like with a user or to notify the user of, for example, the completion of the control). The response controller 9 also determines the speed and/or volume for outputting a response. At this time, if there is a plurality of candidates of an active state associated with the content of a speech utterance recognized by the speech recognizer 4, then the response controller 9 controls the response so as to narrow down to (identify) the active state to be used for identifying a device to be controlled among the plurality of active state candidates.

Figure 2:
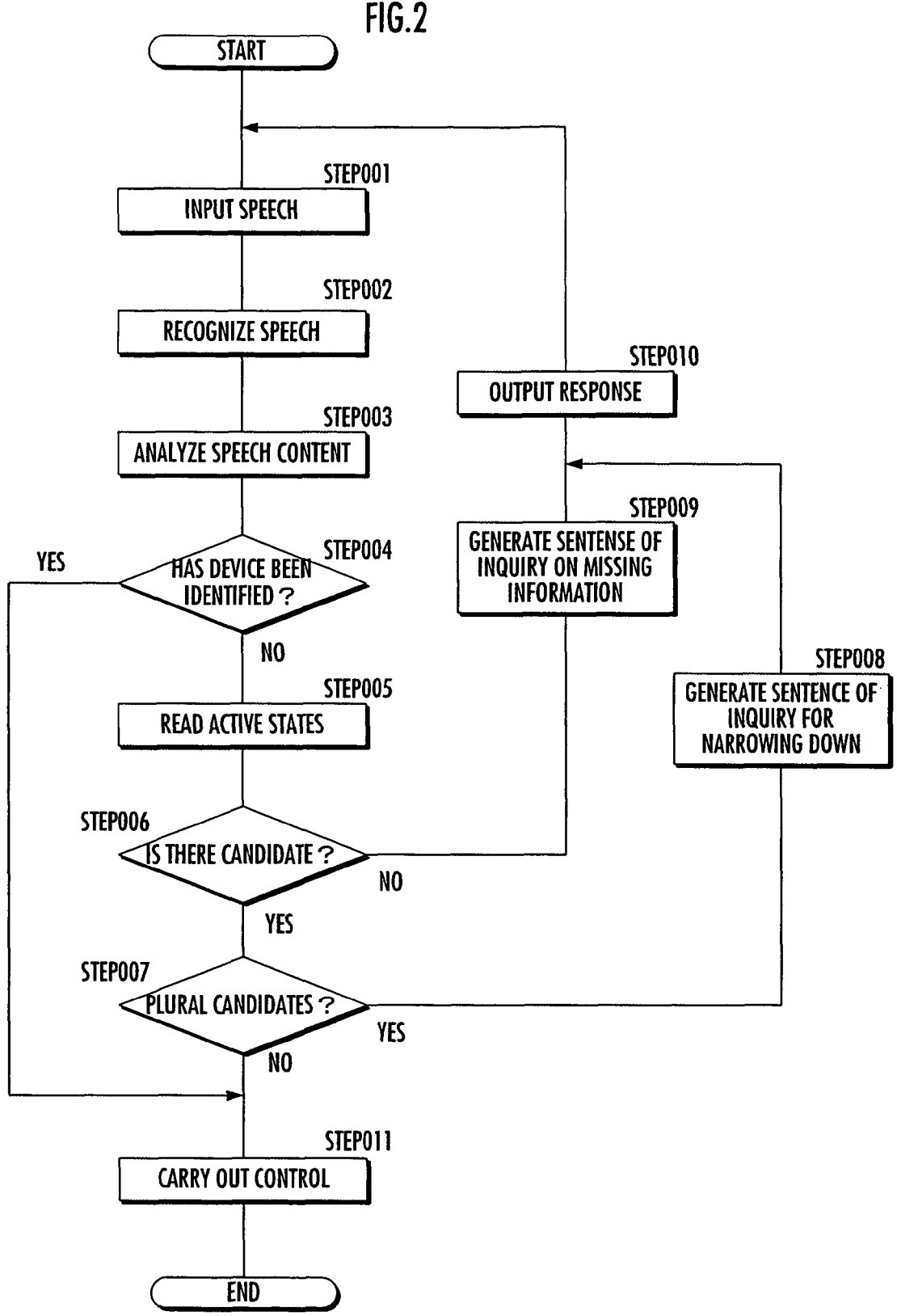
FIG. 2 is a flowchart showing an overall operation (device control processing based on the recognition of a speech) in the speech recognizer control system shown in FIG. 1.

The general operation of the speech recognizer controller 2, that is, the device control processing based on speech recognition, according to the present embodiment will now be explained with reference to a flowchart shown in FIG. 2. Referring to the flowcharts shown in FIG. 2, first, in STEP001, a speech utterance for starting the control of a device is input to the speech input unit 3 from a driver of the vehicle 1. Then, in STEP002, the speech recognizer 4 carries out speech recognition processing, such as the syntax analysis, on the speech utterance input to the speech input unit 3 so as to extract a keyword. At this time, the content of the speech utterance recognized by the speech recognizer 4 is associated with at least one of the sense of sight, the sense of hearing, and the sense of touch.

Subsequently, in STEP003, the device controller 6 analyzes the content of the speech utterance recognized by the speech recognizer 4 and carries out the processing for identifying the device to be controlled, namely, the first device identification processing. Specifically, the device controller 6 refers to a predetermined table or the like showing the correspondence relationship between keywords and items required to control devices, and selects keywords that match appropriate items from among the keyword extracted from the speech utterance. This identifies the data of the items required to control the device. Then, the identified item data is stored in a buffer for storing and retaining the contents of the speech utterances, namely, a speech content storing buffer.

Subsequently, in STEP004, the device controller 6 determines whether the device to be controlled among the devices 5a to 5c and the control description of the device have been identified. If the result of the determination in STEP004 is YES, then the processing proceeds to STEP011.

If the result of the determination in STEP004 is NO, then the processing of the following STEP005 to STEP010 is carried out. First, in STEP005, active states are read from the state change storage 7. Then, in STEP006, it is determined whether there is a candidate of the active state related to the recognized speech utterance content among the read active states (the second device identification processing). The candidate of the active state related to the recognized speech utterance content here means the active state which is associated with the same type of sense as the type of sense associated with the content of the speech utterance among the latest active states of the individual types of senses and the active state which can be controlled on the basis of the content of the speech utterance. The active state being controllable on the basis of the content of the speech utterance indicates a possibility that the content of the speech utterance is, for example, intended for conducting control, such as stopping or changing the active state.

In STEP006, it is first determined whether the latest active states of the individual types of senses of the read active states include an active state associated with the same type of sense as the type of sense associated with the content of the speech utterance. If there is no such associated active state, then it is determined that there is no active state candidates (the determination result in STEP006 being NO), and the processing proceeds to STEP009. If there is an associated active state, then it is determined whether the associated active state is controllable on the basis of the recognized speech utterance content. If no controllable active state is found, then it is determined that there is no active state candidate (the determination result in STEP006 being NO), and the processing proceeds to STEP009. If there is a controllable active state, then the controllable active state is taken as the candidate of the active state related to the recognized speech utterance content.

Subsequently, if the determination result in STEP006 is YES (if there is a candidate of the active state related to the recognized speech utterance content), then it is determined in STEP007 whether there is a plurality of candidates of the active state. If the determination result in STEP007 is NO (if there is only one active state), then the candidate of the active state is defined as the active state for identifying the device to be controlled. Thus, the device which has developed the active state is identified as the device to be controlled, and the processing proceeds to STEP011. If the determination result in STEP007 is YES (if there is a plurality of candidates of the active state), then the processing proceeds to STEP008.

STEP008 is carried out when there is a plurality of candidates of the active state and the device to be controlled cannot be identified by using an active state, since the active state for identifying the device to be controlled cannot be identified. In this case, the response controller 9 generates a sentence of inquiry to the driver so as to identify the active state to be used for identifying the device to be controlled among the plurality of active states. The processing then proceeds to STEP010.

STEP009 is carried out when no candidate of the active state related to the content of the speech utterance is found and therefore the device to be controlled cannot be identified by using an active state. In this case, the response controller 9 generates a sentence of inquiry to the driver to prompt him/her to input the next speech utterance on the information which is missing in the input speech utterance (at least the information required for identifying the device to be controlled). The processing then proceeds to STEP010.

In STEP010, the sentence of inquiry generated by the response controller 9 is output from the response output unit 8. The processing returns to STEP001 from STEP010, and the second speech utterance of the driver is input. Then, as with the first speech utterance, the processing from STEP001 to STEP010 is carried out. For the second speech utterance (the speech utterance in response to the sentence of inquiry output from the response output unit 8), however, the content of the previous speech utterance is read from the speech content storing buffer and used for analyzing the content of the second speech utterance in STEP003. Then, the content of the second speech utterance is combined with the content of the previous speech utterance and stored in the speech content storing buffer. Further, the content of the speech utterance used in STEP004 to STEP010 is composed of the combination of the content of the second speech utterance and the content of the previous speech utterance.

Thereafter, the same processing as that of STEP001 to STEP010 is repeatedly carried out on the aforesaid second speech utterance until the determination result in STEP004 becomes YES or the determination result in STEP007 becomes NO, and then the processing proceeds to STEP011.

In STEP011, the device controller 6 conducts the control of an identified device. Then, the speech content storing buffer is initialized or reset, and the device control processing is terminated. The processing described above makes it possible to properly identify the device to be controlled from speech utterances of a driver and to control the identified device.

The processing in STEP002 corresponds to the speech recognizing step in the speech recognizer control method in accordance with the present invention. Further, STEP003 through STEP007 and STEP011 correspond to the device control step in the speech recognizer control method in accordance with the present invention.

Figure 3:
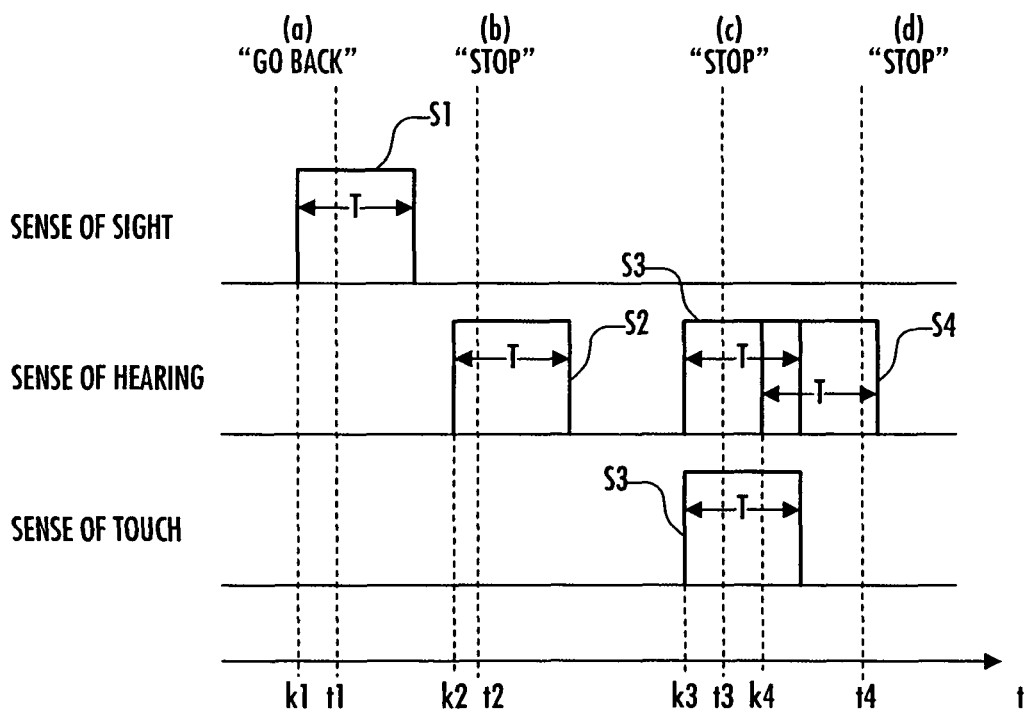
FIG. 3 is a graph showing an example of a state change of a device in the speech recognizer control system shown in FIG. 1.

Specific examples of the aforesaid operation will now be explained in detail in conjunction with FIG. 3. FIG. 3 shows examples of state changes of the devices 5a to 5c, respectively. In FIG. 3, the axis of abscissas indicates time t, the first stage from the top indicates state changes associated with the sense of sight, the second stage indicates state changes associated with the sense of hearing, and the third stage indicates state changes associated with the sense of touch.

Referring to FIG. 3, at time k1, the vehicle 1 is traveling through an intersection, so that the screen display is changed to an enlarged view of the intersection in the navigation system 5b. This state change influences the sense of sight, so that the state change is associated with the sense of sight and stored as active state S1 in the state change storage 7 for the period from time k1 to time k1+T. At time k2, the next number of a CD is played in the audio device 5a. This state change influences the sense of hearing, so that the state change is associated with the sense of hearing and stored as active state S2 in the state change storage 7 for the period from time k2 to time k2+T. At time k3, the air volume is increased in the air conditioner 5c. This state change involves the noise of a fan or the like blowing out air, which influences the sense of hearing, and the air which is blown out influences the sense of touch, so that the state change is associated with the sense of hearing and the sense of touch, and stored as active state S3 in the state change storage 7 for the period from time k3 to k3+T. At time k4, voice guidance is output in the navigation system 5b. This state change influences the sense of hearing, so that the state change is associated with the sense of hearing and stored as active state S4 in the state change storage 7 for the period from time k4 to k4+T.

An explanation will now be given to the device control processing which is carried out when a speech utterance is input from a driver as in the following speech utterance examples (a) to (d) while the state changes are taking place in the devices 5a to 5c as illustrated in FIG. 3. First, speech utterance example (a) will be explained. In speech utterance example (a), a speech utterance "Go back" is input from a driver at time t1 (k1<t1<k1+T). At time t1, the active state S1 is in the state change storage 7.

First, in STEP001, the speech utterance "Go back" is input from the driver. Then, in STEP002, the content of the input speech utterance is recognized. At this time, the recognized content of the speech utterance may be associated with any sense, so that the recognized content is associated with all of the sense of sight, the sense of hearing, and the sense of touch. Next, in STEP003, the processing for identifying the device to be controlled is carried out on the basis of the recognized speech utterance content. At this time, the device to be controlled cannot be identified from the content of the speech utterance "Go back"; therefore, the determination result in STEP004 is NO, and the processing proceeds to STEP005.

In STEP005, the active state S1 stored in the state change storage 7 is read. Then, in STEP006, it is determined whether the active state S1 is a candidate of the active state associated with the recognized content of the speech utterance. At this time, the active state S1 is associated with the sense of sight and included in the sense of sight, the sense of hearing, and the sense of touch with which the content of the speech utterance is associated. Moreover, the content of the speech utterance indicates that the active state S1 is controllable, so that the active state S1 is defined as a candidate of the active state. Next, in STEP007, the active state S1 is identified as an active state for identifying the device to be controlled, because there is one candidate of the active state. This identifies that the device to be controlled is the navigation system 5b and that the content of the speech utterance "Go back" is the content of a speech utterance issued in relation to the state change "Change the screen display to the enlarged view of the intersection." Then, the processing proceeds to STEP011 wherein the control is carried out in the navigation system 5b to switch the screen display back to the screen before the enlarged view of the intersection was displayed. Thus, the navigation system 5b to be controlled can be properly identified and controlled in response to the speech utterance "Go back" of the driver.

Speech examples (b) to (d) will now be explained. All of the speech utterance examples (b) to (d) are examples wherein a speech utterance "STOP" is input from the driver except that the examples differ only in time at which the speech utterance is input. In the speech utterance example (b), the speech utterance is input at time t2 (k2<t2<k2+T). At time t2, the active state S2 is in the state change storage 7. In the speech utterance example (c), the speech utterance is input at time t3 (k3<t3<k3+T). At time t3, the active state S3 is in the state change storage 7. In the speech utterance example (d), the speech utterance is input at time t4 (k4<t4<k4+T). At time t4, the active state S4 is in the state change storage 7.

First, in STEP001, the speech utterance "Stop" is input from the driver. Then, in STEP002, the content of the input speech utterance is recognized. At this time, the recognized content of the speech utterance may be associated with any sense, so that the recognized content is associated with all of the sense of sight, the sense of hearing, and the sense of touch. Next, in STEP003, the processing for identifying the device to be controlled is carried out on the basis of the recognized speech utterance content. At this time, the device to be controlled cannot be identified from the content of the speech utterance "Stop"; therefore, the determination result in STEP004 is NO, and the processing proceeds to STEP005. The same processing up to STEP004 applies to all of the speech utterance examples (b) to (d).

At this time, in the speech utterance example (b), the active state S2 stored in the state change storage 7 is read in STEP005. Then, in STEP006, it is determined whether the active state S2 is a candidate of the active state associated with the recognized content of the speech utterance. At this time, the active state S2 is associated with the sense of hearing and included in the sense of sight, the sense of hearing, and the sense of touch with which the content of the speech utterance is associated. Moreover, the content of the speech utterance indicates that the active state S2 is controllable, so that the active state S2 is defined as a candidate of the active state. Next, in STEP007, the active state S2 is identified as an active state for identifying the device to be controlled, because there is one candidate of the active state. This identifies that the device to be controlled is the audio device 5a and that the content of the speech utterance "Stop" is the content of a speech utterance issued in relation to the state change "Play the next number of CD." Then, the processing proceeds to STEP011 wherein the control is carried out to stop playing the CD in the audio device 5a. Thus, the audio device 5a to be controlled can be properly identified and controlled in response to the speech utterance "STOP" of the driver.

At this time, in the speech utterance example (c), the active state S3 stored in the state change storage 7 is read in STEP005. Then, in STEP006, it is determined whether the active state S3 is a candidate of the active state associated with the recognized content of the speech utterance. At this time, the active state S3 is associated with the sense of hearing and the sense of touch, and included in the sense of sight, the sense of hearing, and the sense of touch with which the content of the speech utterance is associated. In addition, the content of the speech utterance indicates that the active state S3 is controllable, so that the active state S3 is defined as a candidate of the active state. Next, in STEP007, the active state S3 is identified as an active state for identifying the device to be controlled, because there is one candidate of the active state. This identifies that the device to be controlled is the air conditioner 5c and that the content of the speech utterance "Stop" is the content of a speech utterance issued in relation to the state change "Increase the air volume." Then, the processing proceeds to STEP011 wherein the control is carried out to reduce the air volume back to the previous air volume in the air conditioner 5c. Thus, the air conditioner 5c to be controlled can be properly identified and controlled in response to the speech utterance "Stop" of the driver.

At this time, in the speech utterance example (d), the active state S4 stored in the state change storage 7 is read in STEP005. Then, in STEP006, it is determined whether the active state S4 is a candidate of the active state associated with the recognized content of the speech utterance. At this time, the active state S4 is associated with the sense of hearing, and included in the sense of sight, the sense of hearing, and the sense of touch with which the content of the speech utterance is associated. In addition, the content of the speech utterance indicates that the active state S4 is controllable, so that the active state S4 is defined as a candidate of the active state. Next, in STEP007, the active state S4 is identified as an active state for identifying the device to be controlled, because there is one candidate of the active state. This identifies that the device to be controlled is the navigation system 5b and that the content of the speech utterance "Stop" is the content of a speech utterance issued in relation to the state change "Output voice guidance." Then, the processing proceeds to STEP011 wherein the control is carried out to stop the output of the voice guidance in the navigation system 5b. Thus, the navigation system 5b to be controlled can be properly identified and controlled in response to the speech utterance "Stop" of the driver.

In the present embodiment, when conducting the control in STEP011, a sentence of response for confirming with the driver the identified device and the control detail of the device may be generated by the response controller 9 and the generated sentence of response may be output from the response output unit 8.

Second Embodiment

A second embodiment of the present invention will now be explained with reference to FIG. 4 to FIG. 7. The functional block of the speech recognizer control system, which is the present embodiment, is the same as FIG. 1; therefore, the following explanation will be given with reference to FIG. 1.

Referring to FIG. 1, in the present embodiment, a speech input unit 3, which receives speech utterances of a driver of a vehicle 1 and a passenger (e.g., a passenger in a front passenger seat) other than the driver, respectively, is composed of a plurality of microphones or the like. At this time, the individual microphones of the speech input unit 3 have a predetermined positional relationship among the microphones and predetermined acoustic characteristics. A speech recognizer 4 performs processing for identifying a speaker when recognizing the content of a speech utterance input to the speech input unit 3. This identifies whether the driver or a passenger other than the driver has input the speech utterance. Moreover, when the contents of speech utterances are recognized, the contents of speech utterances from the driver and the contents of speech utterances from the passenger other than the driver are distinguished from each other. The processing for identifying speakers uses, for example, a standard source localization method. At this time, the speech recognizer 4 estimates the position of a sound source from the time difference and the intensity difference of a voice signal of a speech utterance input to the individual microphones and identifies the speaker by distinguishing between the driver and the passenger other than the driver.

The state change storage 7 stores, as active states, the state changes of operations in devices 5a to 5c caused by a speech utterance of the passenger other than the driver of the vehicle 1 and the state changes caused by a speech utterance of the driver of the vehicle 1. Of the active states, the active state caused by a speech utterance of a person other than the speaker identified by the speech recognizer 3 is defined as a first active state (corresponding to first auxiliary information for identifying a device to be controlled), and the active state caused by a speech utterance of the speaker identified by the speech recognizer 3 is defined as a second active state (corresponding to second auxiliary information for identifying a device to be controlled).

If the device controller 6 cannot identify the device to be controlled by the first device identification processing, then it carries out the processing for identifying the device by using the first active state stored in the state change storage 7 (second device identification processing). If the device controller 6 cannot identify the device to be controlled by the second device identification processing, then it carries out the processing for identifying the device by using the second active state stored in the state change storage 7 (third device identification processing). In this case, of the active states stored in the state change storage 7, the active state associated with the content of the speech utterance recognized by the speech recognizer 4 is used in the second and the third device identification processing. The construction other than that explained above is the same as the construction of the first embodiment.

The general operation of the speech recognizer control system 2 according to the present embodiment (the device control processing based on speech recognition) will now be explained according to the flowchart shown in FIG. 4. In the following explanation, it will be assumed that a speech utterance is input from the driver of the vehicle 1.

Figure 4:
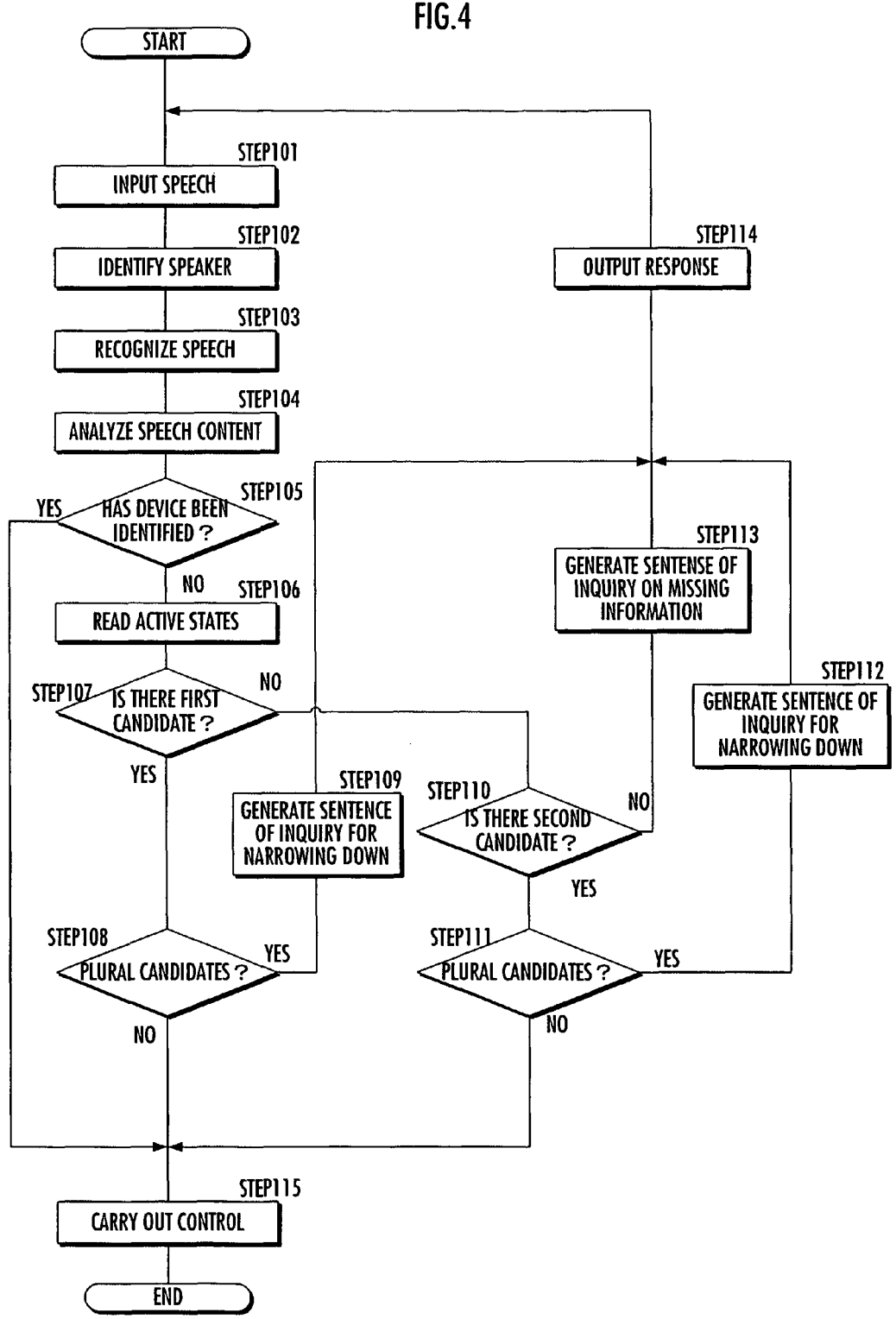
FIG. 4 is a flowchart showing an overall operation (device control processing based on speech recognition) in a speech recognizer control system, which is a second embodiment of the present invention.

Referring to FIG. 4, first, in STEP101, a speech utterance for initiating the control of a device is input to the voice input device 3. Then, in STEP102, the speech utterance recognizer 4 carries out processing for identifying the speaker of the input speech utterance. This identifies that the driver has input the speech utterance. Next, in STEP103, the speech recognizer 4 carries out speech recognition processing, such as syntax analysis, on the speech utterance input to the speech input unit 3 and extracts a keyword. At this time, the content of the speech utterance recognized by the speech recognizer 4 is associated with at least one of the sense of sight, the sense of hearing, and the sense of touch.

Subsequently, in STEP104, the device controller 6 analyzes the content of the speech utterance recognized by the speech recognizer 4 and carries out the processing for identifying the device to be controlled (the first device identification processing). Specifically, the device controller 6 refers to a predetermined table or the like showing the correspondence relationship between keywords and items required to control devices, and selects keywords which match individual items from the keyword extracted from the speech utterance. This identifies the item data required to control the device. Then, the identified item data is stored in a buffer for storing and retaining the contents of the speech utterances, namely, a speech content storing buffer.

Subsequently, in STEP105, the device controller 6 determines whether the device to be controlled among the devices 5a to 5c and the control information of the device have been identified. If a result of the determination in STEP105 is YES, then the processing proceeds to STEP115.

If the result of the determination in STEP105 is NO, then the processing of the following STEP106 to STEP114 is carried out. First, in STEP106, active states are read from the state change storage 7. Then, in STEP107, it is determined whether there is a candidate of the first active state related to the recognized speech utterance content among the read active states (the second device identification processing). The candidate of the first active state related to the recognized speech utterance content here means the first active state which is associated with the same type of sense as the type of sense associated with the content of the speech utterance among the latest first active states of the individual types of senses and which is the first active state that can be controlled on the basis of the content of the speech utterance, as with the candidate of the active state in the first embodiment.

In STEP107, it is first determined whether the latest first active states of the individual types of senses of the read first active states include a first active state associated with the same type of sense as the type of sense associated with the content of the speech utterance. If there is no such associated first active state, then it is determined that there is no candidates of the first active state (the determination result in STEP107 being NO), and the processing proceeds to STEP110. If an associated first active state is found, then it is determined whether the associated first active state can be controlled on the basis of the recognized speech utterance content. If no controllable first active state is found, then it is determined that there is no candidate of the first active state (the determination result in STEP107 being NO), and the processing proceeds to STEP110. If there is a controllable first active state, then the first active state is defined as the candidate of the first active state related to the recognized speech utterance content.

Subsequently, if the determination result in STEP107 is YES (if there is a candidate of the first active state related to the recognized speech utterance content), then it is determined in STEP108 whether there is a plurality of candidates of the first active state. If the determination result in STEP108 is NO (if there is only one first active state), then the candidate of the first active state is defined as the active state for identifying the device to be controlled. Thus, the device which has developed the active state is identified as the device to be controlled, then the processing proceeds to STEP115. If the determination result in STEP108 is YES (if there is a plurality of candidates of the first active state), then the processing proceeds to STEP109.

STEP109 is carried out when there is a plurality of candidates of the first active state and the device to be controlled cannot be identified by using an active state, since the active state for identifying the device to be controlled cannot be identified. In this case, a response controller 9 generates a sentence of inquiry to the driver so as to identify the active state to be used for identifying the device to be controlled among the plurality of candidates of the first active state. The processing then proceeds to STEP114.

STEP110 is carried out when the device to be controlled cannot be identified by the second device identification processing. In this case, it is determined in STEP110 whether the read active states include a candidate of a second active state related to the recognized speech utterance content (the third device identification processing). As with the candidate of the first active state, the candidate of the second active state related to the recognized speech utterance content means the second active state associated with the same type of sense as the type of sense associated with the content of the speech utterance among the latest second active state of each type of sense, and the second active state which can be controlled on the basis of the content of the speech utterance.

In STEP110, it is first determined whether the latest second active states of the individual types of senses of the read second active states include a second active state associated with the same type of sense as the type of sense associated with the content of the speech utterance. If there is no such associated second active state, then it is determined that there is no candidates of the second active state (the determination result in STEP110 being NO), and the processing proceeds to STEP113. If there is an associated second active state, then it is determined whether the associated second active state can be controlled on the basis of the recognized speech utterance content. If there is no controllable second active state, then it is determined that there is no candidate of the second active state (the determination result in STEP110 being NO), and the processing proceeds to STEP113. If there is a controllable second active state, then the second active state is defined as the candidate of the second active state related to the recognized speech utterance content.

Subsequently, if the determination result in STEP110 is YES (if there is a candidate of the second active state related to the recognized speech utterance content), then it is determined in STEP111 whether there is a plurality of candidates of the second active state. If the determination result in STEP111 is NO (if there is only one second active state), then the candidate of the second active state is defined as the active state for identifying the device to be controlled. Thus, the device which has developed the active state is identified as the device to be controlled, and the processing proceeds to STEP115. If the determination result in STEP111 is YES (if there is a plurality of candidates of the second active state), then the processing proceeds to STEP112.

STEP112 is carried out when there is a plurality of candidates of the second active state and the device to be controlled cannot be identified by using an active state, since the active state for identifying the device to be controlled cannot be identified. In this case, a response controller 9 generates a sentence of inquiry to the driver so as to identify the active state to be used for identifying the device to be controlled among the plurality of candidates of the second active state. The processing then proceeds to STEP114.

STEP113 is carried out when no candidates of the first and the second active states associated with the content of the speech utterance are found and therefore the device to be controlled cannot be identified by using active states. In this case, the response controller 9 generates a sentence of inquiry to the driver to prompt the driver to input another speech utterance covering the missing information in the input speech utterance (at least the information required for identifying the device to be controlled). The processing then proceeds to STEP114.

In STEP114, the sentence of inquiry generated by the response controller 9 is output from the response output unit 8. The processing returns to STEP101 from STEP114, and a second speech utterance is input. Then, as with the first speech utterance, the processing of STEP101 to STEP114 is carried out. For the second speech utterance (the speech utterance in response to the sentence of inquiry output from the response output unit 8), however, the content of the previous speech utterance is read from the speech content storing buffer and used for analyzing the content of the second speech utterance in STEP104. Then, the content of the second speech utterance is combined with the content of the previous speech utterance and stored in the speech content storing buffer. Further, the content of the speech utterance used in STEP105 to STEP114 is composed of the combination of the content of the second speech utterance and the content of the previous speech utterance.

Thereafter, the same processing as that of STEP101 to STEP114 is repeatedly carried out on the aforesaid second speech utterance until the determination result in STEP105 becomes YES or the determination result in STEP108 becomes NO, and the processing proceeds to STEP115.

In STEP115, the device controller 6 conducts the control of an identified device. At this time, a sentence of response for confirming with the driver the identified device and the control detail of the device is generated by the response controller 9 and the generated sentence of response is output from the response output unit 8. Then, the speech content storing buffer is initialized or reset and the device control processing is terminated. The processing described above makes it possible to properly identify the device to be controlled in response to speech utterances of a driver and to control the identified device.

Specific examples of the aforesaid operation will now be explained in detail in conjunction with FIG. 5 to FIG. 7. FIG. 5 to FIG. 7 show examples of state changes of the devices 5a to 5c, respectively. In each of FIG. 5 to FIG. 7, the axis of abscissas indicate time t, the first stage from the top indicates state changes associated with the sense of sight, the second stage indicates state changes associated with the sense of hearing, and the third stage indicates state changes associated with the sense of touch. In FIGS. 5 to 7, the areas corresponding to the first active state are hatched.

The explanation will be given, referring first to FIG. 5. In the example shown in FIG. 5, at time k5, a speech utterance "Bring up audio screen" is input from a passenger in a front passenger seat, and a speech utterance "Move to the next number" is input from the driver. In response thereto, the speech recognizer control system 2 outputs a response "Will play the next number and change the screen to the audio screen." The speech utterance from the passenger in the front passenger seat causes the screen display to the audio screen in the navigation system 5b. This state change influences the sense of sight, so that the state change is associated with the sense of sight and stored as active state S5 in the state change storage 7 for the period from time k5 to time k5+T. At the same time, the speech utterance from the driver causes the audio device 5a to play the next number. This state change influences the sense of hearing, so that the state change is associated with the sense of hearing and stored as active state S6 in the state change storage 7 for the period from time k5 to time k5+T.

An explanation will now be given to the device control processing which is carried out when a speech utterance is input from a driver as in the following speech utterance example (e) while the state changes are taking place in the devices 5a to 5c, as illustrated in FIG. 5. In the speech utterance example (e), a speech utterance "Cancel" is input from a driver at time t5 (k5<t5<k5+T). At time t5, the active states S5 and S6 are in the state change storage 7.

First, in STEP101, the speech utterance "Cancel" is input. Then, in STEP102, the speech utterance input from the driver is identified. Next, the content of the input speech utterance is recognized in STEP103. At this time, the recognized content of the speech utterance may be associated with any sense, so that the recognized content is associated with all of the sense of sight, the sense of hearing, and the sense of touch. Next, in STEP104, the processing for identifying the device to be controlled is carried out on the basis of the recognized speech utterance content. At this time, the device to be controlled cannot be identified from the content of the speech utterance "Cancel"; therefore, the determination result in STEP105 is NO, and the processing proceeds to STEP106.

In STEP106, the active states S5 and S6 stored in the state change storage 7 are read. Then, in STEP107, it is determined whether the first active state S5 is a candidate of the first active state associated with the recognized content of the speech utterance. At this time, the first active state S5 is associated with the sense of sight and included in the sense of sight, the sense of hearing, and the sense of touch with which the content of the speech utterance is associated. Moreover, the content of the speech utterance indicates that the first active state S5 is controllable, so that the first active state S5 is defined as a candidate of the first active state.

Subsequently, in STEP108, the first active state S5 is identified as an active state for identifying the device to be controlled, because there is one candidate of the first active state. This identifies that the device to be controlled is the navigation system 5b and that the content of the speech utterance "Cancel" is the content of a speech utterance issued in relation to the state change "Change the screen display to the audio screen display." Then, the processing proceeds to STEP115 wherein a sentence of response "Will go back to the previous screen display" is generated by the response controller 9 and the generated sentence is output from the response output unit 8, then the control is carried out in the navigation system 5b to switch the screen display back to the screen before the audio screen was brought up. Thus, the navigation system 5b to be controlled can be properly identified and controlled in response to the speech utterance "Cancel" of the driver.

An explanation will now be given with reference to FIG. 6. In the example shown in FIG. 6, at time k6, a speech utterance "Turn on the air conditioner" is input from a passenger in the front passenger seat and a speech utterance "Reduce the map" is input from the driver. In response thereto, the speech recognizer control system 2 outputs a response "Will reduce the map and turn on the air conditioner." The speech utterance from the passenger in the front passenger seat causes the air conditioner 5c to turn on. This state change involves a noise of a fan or the like through which air is blown out, influencing the sense of hearing, and the air blown out influences the sense of touch, so that the state change is associated with the sense of hearing and the sense of touch, and stored as an active state S7 in the state change storage 7 for the period from time k6 to time k6+T. At the same time, the speech utterance from the driver causes the navigation system 5b to reduce the map displayed on the screen. This state change influences the sense of sight, so that the state change is associated with the sense of sight and stored as an active state S8 in the state change storage 7 for the period from time k6 to time k6+T.

An explanation will now be given to the device control processing which is carried out when a speech utterance is input from a driver as in the following speech utterance example (f) while the state changes are taking place in the devices 5a to 5c, as illustrated in FIG. 6. In the speech utterance example (f), a speech utterance "I've changed my mind. Enlarge it." is input from a driver at time t6 (k6<t6<k6+T). At time t6, the active states S7 and S8 are in the state change storage 7.

First, in STEP101, the speech utterance "I've changed my mind. Enlarge it." is input. Then, in STEP102, the speech utterance input from the driver is identified. Next, the content of the input speech utterance is recognized in STEP103. At this time, the recognized content of the speech utterance is visual, so that it is associated with the sense of sight. Next, in STEP104, the processing for identifying the device to be controlled is carried out on the basis of the recognized speech utterance content. At this time, the device to be controlled cannot be identified from the content of the speech utterance "I've changed my mind. Enlarge it." Therefore, the determination result in STEP105 is NO, and the processing proceeds to STEP106.

In STEP106, the active states S7 and S8 stored in the state change storage 7 are read. Then, in STEP107, it is determined whether the first active state S7 is a candidate of the first active state associated with the recognized speech utterance content. At this time, the first active state S7 is associated with the sense of hearing and the sense of touch, which is different from the sense of sight with which the speech utterance content is associated, so that it is determined that there is no candidate of the first active state.

Subsequently, in STEP110, it is determined whether the second active state S8 is a candidate of the second active state associated with the recognized speech utterance content. At this time, the second active state S8 is associated with the sense of sight and this is the same as the sense of sight with which the speech utterance content is associated. Furthermore, the speech utterance content indicates that the second active state S8 is controllable, so that the second active state S8 is defined as the candidate of the second active state.

Subsequently, in STEP111, the second active state S8 is identified as an active state for identifying the device to be controlled, because there is one candidate of the second active state. This identifies that the device to be controlled is the navigation system 5b and that the content of the speech utterance "I've changed my mind. Enlarge it." is the content of a speech utterance issued in relation to the state change "Reduce the map displayed on the screen." Then, the processing proceeds to STEP115 wherein a sentence of response "Will go back to the previous screen display" is generated by the response controller 9 and the generated sentence is output from the response output unit 8, then the control is carried out in the navigation system 5b to switch the size of the map displayed on the screen back to the size before the map was reduced by the device controller 6. Thus, the navigation system 5b to be controlled can be properly identified and controlled in response to the speech utterance of the driver "I've changed my mind. Enlarge it."

An explanation will now be given with reference to FIG. 7. In the example shown in FIG. 7, at time k7, a speech utterance "Start rapid cooling, and find a restaurant nearby." is input from a passenger in the front passenger seat. In response thereto, the speech recognizer control system 2 outputs a response "Has been set." Further, the screen display is changed to a search screen in the navigation system 5b in response to the speech utterance from the passenger in the front passenger seat. This state change exerts a visual influence and the state change is therefore associated with the sense of sight, and stored as an active state S9 in the state change storage 7 for the period from time k7 to time k7+T. At the same time, in response to the speech utterance from the passenger in the front passenger seat, the air conditioner 5c is turned on. This state change involves the noise of a fan or the like blowing out air, which influences the sense of hearing, and the air, which is blown out, influences the sense of touch, so that the state change is associated with the sense of hearing and the sense of touch, and stored as an active state S10 in the state change storage 7 for the period from time k7 to k7+T.

An explanation will now be given to the device control processing which is carried out when a speech utterance is input from a driver as in the following speech utterance example (g) while the state changes are taking place in the devices 5a to 5c, as illustrated in FIG. 7. In the speech utterance example (g), a speech utterance "Too loud" is input from a driver at time t7 (k7<t7<k7+T). At time t7, the active states S9 and S10 are in the state change storage 7.

First, in STEP101, the speech utterance "Too loud" is input. Then, in STEP102, the input of the speech utterance from the driver is identified. Next, the content of the input speech utterance is recognized in STEP103. At this time, the recognized content of the speech utterance is auditory, so that it is associated with the sense of hearing. Next, in STEP104, the processing for identifying the device to be controlled is carried out on the basis of the recognized speech utterance content. At this time, the device to be controlled cannot be identified from the content of the speech utterance "Too loud"; therefore, the determination result in STEP105 is NO, and the processing proceeds to STEP106.

In STEP106, the active states S9 and S10 stored in the state change storage 7 are read. Then, in STEP107, it is determined whether the first active states S9 and S10 are candidates of the first active state associated with the recognized content of the speech utterance. At this time, the first active state S9 is associated with the sense of sight, which is different from the sense of hearing with which the speech utterance content is associated. Meanwhile, the first active state S10 is associated with the sense of hearing and the sense of touch and it includes the same type of sense as the sense of hearing with which the speech utterance content is associated. Furthermore, the content of the speech utterance indicates that the first active state S10 is controllable, so that the first active state S10 is defined as a candidate of the first active state.

Subsequently, in STEP108, the first active state S10 is identified as an active state for identifying the device to be controlled, because there is one candidate of the first active state. This identifies that the device to be controlled is the air conditioner 5c and that the content of the speech utterance "Too loud" is the content of a speech utterance issued in relation to the state change "Turn on." Then, the processing proceeds to STEP115 wherein a sentence of response "Will weaken air blow" is generated by the response controller 9 and the generated sentence is output from the response output unit 8, and the control is carried out to reduce the air volume of the air conditioner 5c. Thus, the air conditioner 5c to be controlled can be properly identified and controlled in response to the speech utterance "Too loud" of the driver.

In the first and the second embodiments, the speech recognizer control system 2 has been adapted to be mounted in the vehicle 1; however, the speech recognizer control system 2 may alternatively be mounted in a mobile body other than a vehicle, a household appliance, a personal computer, and so on.

What is claimed is:

1. A speech recognizer control system comprising:
    a speech input element to which a speech utterance is inputted from a first user;
    a speech recognition element which recognizes a content of the speech utterance input to the speech input element;
    a device controlling element which identifies a device to be controlled among a plurality of devices on the basis of at least the content of the speech utterance recognized by the speech recognition element, wherein the content of the speech utterance controls an operation of the identified device; and
    a state change storing element storing a first auxiliary information for identifying a device to be controlled, wherein the first auxiliary information comprises an identification of an active state corresponding to at least a state change not caused by a speech utterance from the first user, wherein the state change is stored as an active state until a predetermined amount of time elapses from a time at which the state change occurred, wherein the first auxiliary information further comprises an identification of at least one of a plurality of predetermined types of human senses associated with the content of the speech utterance;
    wherein the device controlling element executes first device identification processing for identifying the device to be controlled on the basis of the content of the speech utterance recognized by the speech recognition element; and if the device cannot be identified by the first device identification processing, then the device controlling element uses at least the first auxiliary information stored in the state change storing element to identify the device to be controlled.

2. The speech recognizer control system according to claim 1, wherein
    the state change storing element stores, as the first auxiliary information, a state change which automatically takes place in each of the devices.

3. The speech recognizer control system according to claim 1, wherein
    the speech input element receives speech utterances from the first user and another person other than the first user, respectively,
    the speech recognition element recognizes the contents of the speech utterances input to the speech input element while distinguishing the content of the speech utterance of the first user from the content of the speech utterance of another person, and
    the state change storing element stores, as the first auxiliary information, a state change of an operation in each of the devices that has caused by the speech utterance of another person.

4. The speech recognizer control system according to claim 1, wherein
    the speech recognition element recognizes the content of the speech utterance input to the speech input element by associating the content of the speech utterance with one of the plurality of predetermined types of human senses,
    the state change storing element associates the first auxiliary information with one of the plurality of types of human senses when storing the first auxiliary information, and
    the device controlling element uses the first auxiliary information which is associated with the same type of human sense as the type of human sense with which the content of the speech utterance recognized by the speech recognition element is associated in the first auxiliary information stored by the state change storing element in order to identify the device to be controlled if the device cannot be identified by the first device identification processing.

5. The speech recognizer control system according to claim 1, wherein the device controlling element uses a latest piece of first auxiliary information of the pieces of first auxiliary information stored by the state change storing element in order to identify the device to be controlled if the device to be controlled cannot be identified by the first device identification processing.

6. The speech recognizer control system according to claim 1, wherein the state change storing element stores, in addition to the first auxiliary information, a state change caused by a speech utterance of the first user as second auxiliary information for identifying the device to be controlled, and the device controlling element executes second device identification processing for identifying the device to be controlled by using the first auxiliary information stored by the state change storing element if the device cannot be identified by the first device identification processing, and if the device cannot be identified by the second device identification processing, then the device controlling element uses the second auxiliary information stored by the state change storing element to identify the device.

7. The speech recognizer control system according to claim 1, further comprising:

a response output element which outputs a response to the first user; and a response controlling element which controls the response such that, if there is a plurality of pieces of the first auxiliary information related to the content of the speech utterance recognized by the speech recognition element, the piece of the first auxiliary information to be used for identifying the device to be controlled is identified from among the plurality of pieces of the first auxiliary information.

8. A speech recognizer control system which has a microphone to which a speech utterance is input from a first user and a computer having an interface circuit for accessing speech data obtained through the microphone, recognizes the content of the speech utterance of the first user input to the microphone by arithmetic processing by the computer, identifies a device to be controlled among a plurality of devices on the basis of at least the recognized content of the speech utterance, and controls an operation of the identified device, the speech recognizer control system comprising:

a memory which stores, as first auxiliary information for identifying the device to be controlled, an identification of an active state corresponding to at least a state change not caused by the speech utterance from the first user, wherein the state change is stored as an active state until a predetermined amount of time elapses from a time at which the state change occurred, wherein the computer executes:

first device identification processing for identifying the device to be controlled on the basis of the content of the speech utterance recognized by the speech recognition element, and second device identification processing for identifying the device by using at least the first auxiliary information if the device cannot be identified by the first device identification processing.

9. A speech recognizer control method comprising:

a speech recognizing step which recognizes a content of a speech utterance of a first user input to a speech input element;

a device controlling step which identifies a device to be controlled among a plurality of devices on the basis of at least the content of the speech utterance recognized in the speech recognizing step, wherein the content of the speech utterance controls an operation of the identified device; and a state change storing step storing a first auxiliary information for identifying the device to be controlled, in a state change storing element, wherein the first auxiliary information comprises an identification of an active state corresponding to at least a state change not caused by the speech utterance from the first user, wherein the state change is stored as an active state until a predetermined amount of time elapses from a time at which the state change occurred, wherein the first auxiliary information further comprises an identification of at least one of a plurality of predetermined types of human senses associated with the content of the speech utterance, wherein the device controlling step executes first device identification processing for identifying the device to be controlled on the basis of the content of the speech utterance recognized in the speech recognizing step, and if the device cannot be identified by the first device identification processing, then at least the first auxiliary information stored in the state change storing step is used to identify the device to be controlled.

10. A non-transitory storage medium encoded with a speech recognizer control program having control logic stored therein for causing a computer to execute:

speech recognition processing for recognizing a content of a speech utterance of a first user input to a speech input element;

device control processing for identifying a device to be controlled among a plurality of devices on the basis of at least the content of the speech utterance recognized by the speech recognition processing and for controlling an operation of the identified device based on the content of the speech utterance; and state change storage processing for storing a first auxiliary information for identifying the device to be controlled, in a state change storing element, wherein the first auxiliary information comprises an identification of an active state corresponding to at least a state change not caused by the speech utterance from the first user, wherein the state change is stored as an active state until a predetermined amount of time elapses from a time at which the state change occurred, wherein the first auxiliary information further comprises an identification of at least one of a plurality of predetermined types of human senses associated with the content of the speech utterance, wherein the device control processing has a function which causes the computer to execute:

first device identification processing for identifying the device to be controlled on the basis of the content of the speech utterance recognized by the speech recognition processing; and second device identification processing for identifying the device to be controlled by using at least the first auxiliary information if the device cannot be identified by the first device identification processing.

\* \* \* \* \*